United States Patent
Narang et al.

(10) Patent No.: US 11,977,591 B2
(45) Date of Patent: May 7, 2024

(54) SYNTHESIZED FACTS FROM MULTIPLE SOURCES

(71) Applicant: Microsoft Technology Licensing, LLC, Redmond, WA (US)

(72) Inventors: Mridu Baldevraj Narang, Bellevue, WA (US); Jun Liu, Kenmore, WA (US); Guihong Cao, Sammamish, WA (US); Zicheng Huang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 544 days.

(21) Appl. No.: 15/923,715

(22) Filed: Mar. 16, 2018

(65) Prior Publication Data
US 2019/0286750 A1 Sep. 19, 2019

(51) Int. Cl.
*G06F 16/90* (2019.01)
*G06F 16/2457* (2019.01)
*G06F 16/9535* (2019.01)

(52) U.S. Cl.
CPC .... *G06F 16/9535* (2019.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 5,754,850 | A * | 5/1998 | Janssen | G06F 16/24578 707/999.005 |
| 7,827,060 | B2 * | 11/2010 | Wright | G06Q 30/0246 705/14.4 |
| 9,672,259 | B2 * | 6/2017 | Achuthan | G06Q 30/0625 |
| 2006/0064411 | A1 * | 3/2006 | Gross | G06F 16/90324 |
| 2006/0100969 | A1 * | 5/2006 | Wang | G06Q 30/0283 705/400 |
| 2006/0195440 | A1 * | 8/2006 | Burges | G06N 3/045 707/999.005 |
| 2010/0057718 | A1 * | 3/2010 | Kulkarni | G06F 16/951 707/E17.071 |
| 2013/0297625 | A1 * | 11/2013 | Bierner | G06F 16/33 707/754 |
| 2014/0250119 | A1 * | 9/2014 | Bhattiprolu | G06F 16/256 707/728 |
| 2015/0161126 | A1 * | 6/2015 | Wang | G06F 16/951 707/728 |
| 2018/0341685 | A1 * | 11/2018 | Indyk | G06F 16/00 |

* cited by examiner

*Primary Examiner* — Belix M Ortiz Ditren

(57) ABSTRACT

Systems, methods, and computer-executable instructions for synthesizing facts from multiple sources. A user search string associated with a topic is received. Queries associated with the user search string are generated. Website content is queried, using the plurality of queries associated with the user search string, to generate results. The results are ranked based on a first feature. The results are filtered based on the first feature to generate intermediate results. The intermediate results are ranked based on a second feature. The second feature is most costly to calculate than the first feature. The filtered intermedia results are filtered based on the second feature to generate final results. Distinct facts from the final results are determined. The distinct facts include content from different URLs. The distinct facts associated with the topic are returned.

20 Claims, 6 Drawing Sheets

300

```
← → ⟳ | 🔒  WWW.BING.COM
```

| IS KALE HEALTHY? 🗕 310 | 🔍 |

10,000,000 Results

KALE FACTS
Summarized from 3 sources

* KALE IS LOW IN SATURATED FAT AND VERY LOW IN CHOLESTEROL. [1]

* KALE IS A GOOD SOURCE OF DIETARY FIBER, PROTEIN, THIAMIN, RIBOFLAVIN, FOLATE, IRON, AND VITAMINS A, C, K, AND B6. [2]

* KALE IS RICH IN POLYPHENOLIC FLAVONOID COMPUNDS. [3]

Sources: [1] encara.com [2] webmd.com [3] kale.com  — 340

— 320

KALE: HEALTH BENEFITS & NUTRITION FACTS
HTTP://webmd.com/diet/7-fun-facts-acout-kale
DESCRIPTION — 330

SUPERFOOD - KALE
HTTP://livescience.com/kale-nutrition.html
DESCRIPTION

Related searches for is kale healthy?
is kale healthy to eat        is kale high in iron
can you eat raw kale       is raw kale healthy 1   2   3   4   5  →

*FIG. 3*

SYNTHESIZED FACTS FROM MULTIPLE SOURCES

BACKGROUND

Search engines are useful for finding documents related to a topic or entity. Users may also use search engines to retrieve information about a topic in a query where data in a more aggregated form from multiple sources may be more complete and useful. The query may be formulated as a question like 'tell me something about pharaohs' or 'facts about world war two'. A search engine may use a question answering system when a query that represents a question is received. Such questions need a comprehensive and complete answer instead of a few snippets of text and are a unique segment in question answering systems. Traditional question answering systems match a question with a relevant passage from a single web document. Such an approach limits the possible answers to a continuous snippet or passage within the document.

BRIEF DESCRIPTION OF THE DRAWINGS

FIG. 3 is an example search results screen combining search results and related facts in accordance with respective examples.

DETAILED DESCRIPTION

Using a single web document for finding answers to a question is a limited approach that likely fails to satisfy a user's intention. Further, the quality of answers is highly dependent on the single web document source. In the disclosed embodiments, topic detection from a user search string, which may be a query, is performed. In addition, candidate answers about the topic are found from multiple sources. Candidate facts may be found by searching web documents using an original query and additional queries by expanding the original query.

Selecting final facts to provide in response to a query becomes difficult and costly as the number of candidate facts increases. Accordingly, disclosed embodiments efficiently filter and select the final facts from a large set of candidate facts. To filter candidate facts, various features of the candidate facts may be calculated. The cost of calculating a feature may be expressed in terms of memory and computational power. Multiple levels of filtering may be used that allow a large number of candidate facts to be filtered to a final set in a cost efficient manner. Earlier levels of filtering may use features that are easier or less costly to calculate than other features. The features used in the earlier level of filtering may be used to reduce the size of the candidate facts by pruning the least relevant candidates. Later levels of filtering may use other features that are more costly to calculate. Since the size of the candidate facts, however, has been reduced by the earlier levels of filtering, the later features are not calculated on all initial candidates but only for the candidates that survive the earlier level of filtering. Accordingly, the candidate facts may be filtered to the final facts that are returned in an efficient manner. In this manner, the described techniques achieve a variety of technical advantages including, but not limited to, increasing computing system speed, conserving memory, and reducing processor load, while making sure that less relevant candidates are pruned at each stage of filtering.

In addition, the original query may be used to search web documents to generate web query search results. Embodiments combine both the web query search results along with a summary of the final facts in a search results page. Accordingly, a user interface that contains a combination of facts, sources of the facts, and search results for a query is described. In this manner, the described techniques achieve a variety of additional technical advantages including, but not limited to, improved user efficiency and increased user interaction performance.

Figure 1:
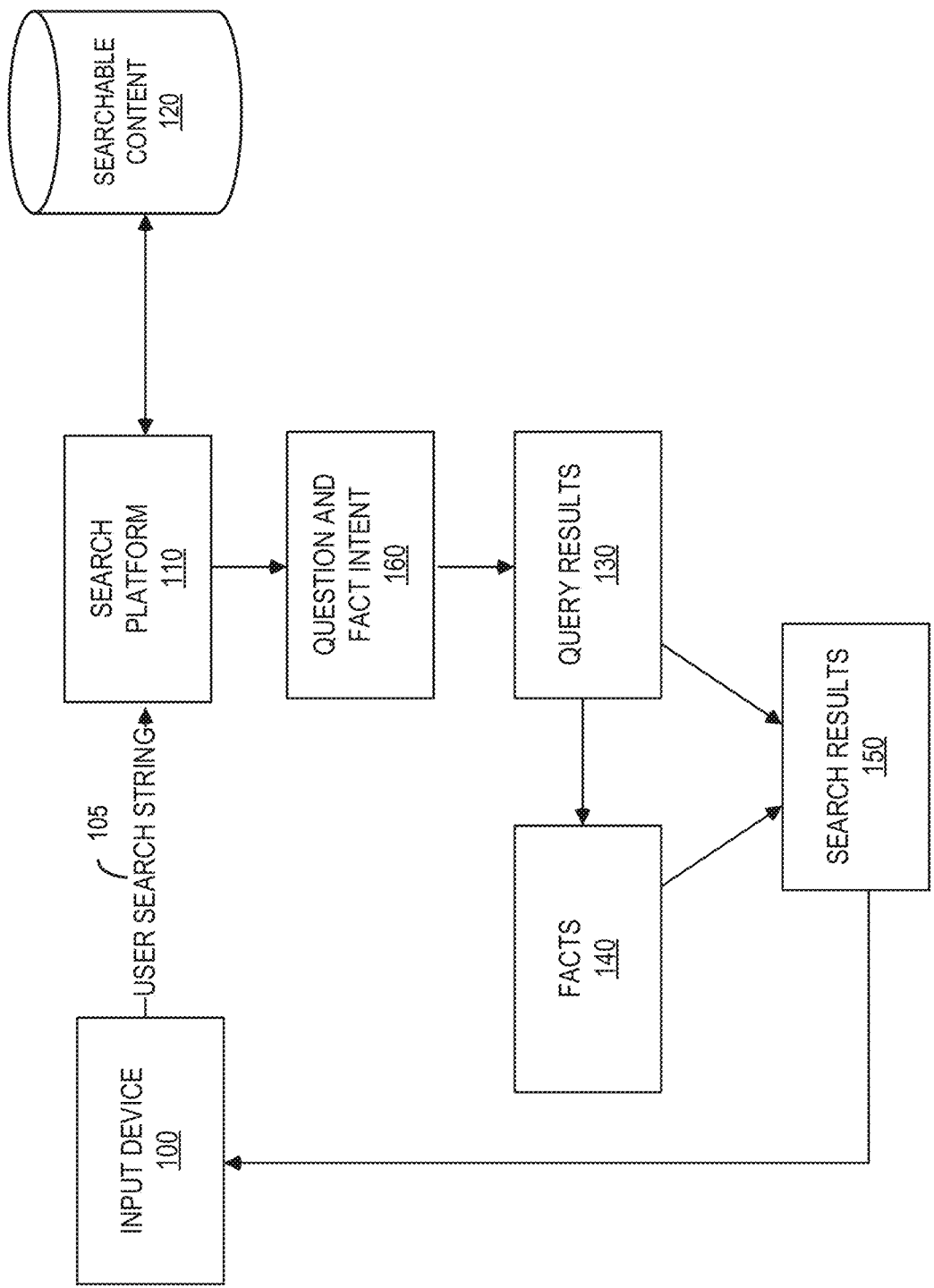
FIG. 1 is a block diagram of a system for synthesizing facts from multiple sources in accordance with respective examples.

FIG. 1 is a block diagram of a system for synthesizing facts from multiple sources in accordance with respective examples. A user may use an input device 100, such as a web browser, to submit a user search string 105 to a search platform 110, such as a search engine. The search platform 110 may use the user search string 105 to search a datastore of searchable content 120. The searchable content 120 may include web documents which may include web pages and indexable files such as word processing documents, spreadsheets, text files, presentations, audiovisual file metadata, etc. The searchable content 120 may be web document content with a corresponding uniform resource locator (URL) where the web document content is accessible. Query results 130 may include relevant web document content that is formatted into search results 150. The search results 150 are returned to and rendered at the input device 100. The search results 150 may be rendered through a browser, a personal assistant user interface, presented audibly, or via other modalities.

In addition to generating query results 130, the search platform 110 or another computing device may analyze the query to determine if the user search string 105 contains a question intent and a fact intent 160. For example, the user's query has a question intent and its objective is to obtain one or more facts or some explanatory description about a particular topic. A question query is one where the user wants to find a direct answer to either an implicit or explicit question, 'what is the height of tom cruise' or 'steps to reset iphone'. A fact intent query is a question query that can be best answered with aggregated facts that are more descriptive, e.g., 'facts about roman empire' is an example of a query that has a fact intent. As another example, the query "reasons for the fall of Rome," would also be identified as a fact intent query. In addition, a query that contains a descriptive question intent and contains an entity may also be considered a query that has a fact intent. As an example, the query "explanations for the civils rights act of 1964," is a query that has descriptive question intent and contains an entity, civil rights act of 1964. Accordingly, this query may be considered a query that has a fact intent. If the user search string 105 is determined to be a question and fact intent query, then facts 140 related to the user search string 105 may also be determined. The search results 150 may combine both the query results 130 and the facts 140. Thus, the search platform 110 may return the search results 150 that contain both query results 130 and facts 140 related to the user search string 105. In an example, the facts 140 include a fact passage and a source link. The source link points to content from which the fact passage was derived.

Figure 2:
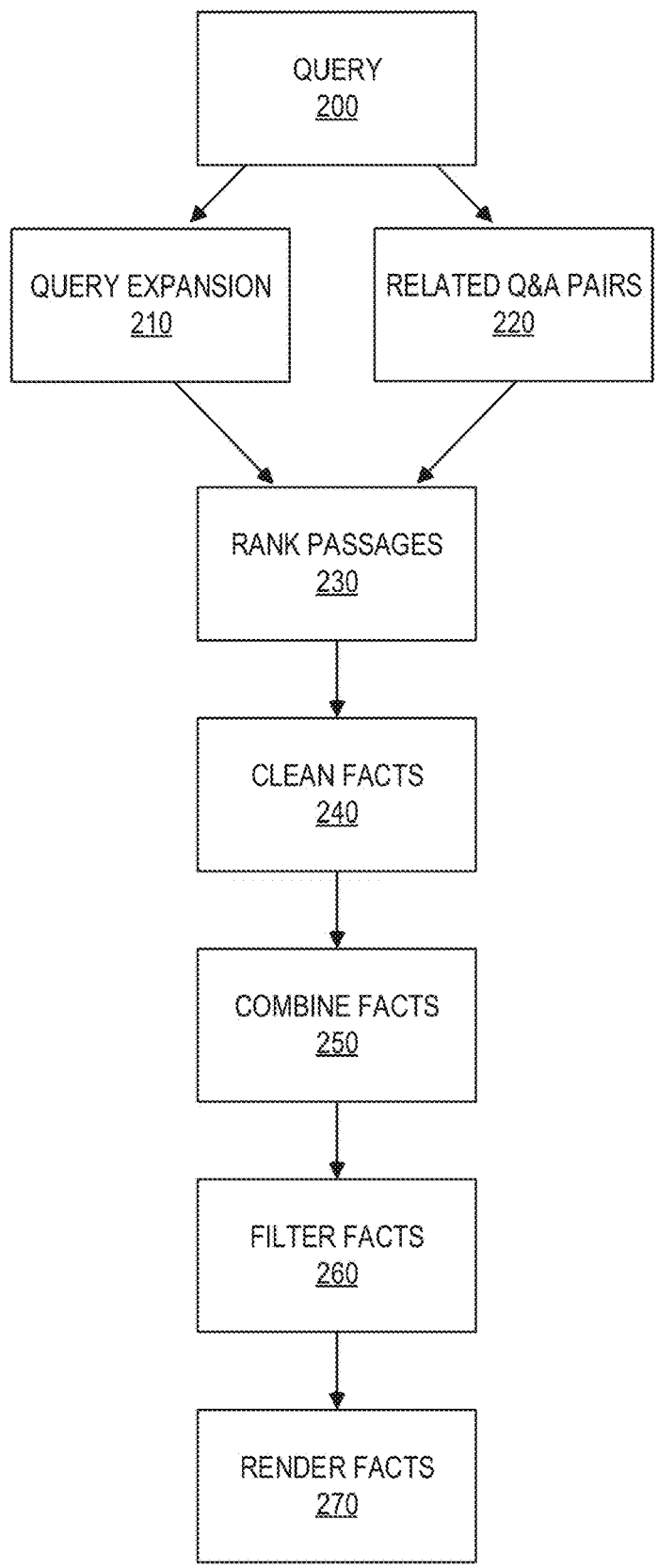
FIG. 2 is a flow diagram of a process for determining facts related to a query in accordance with respective examples.

In an embodiment, the facts 140 are determined by searching the searchable content 120 based on a topic of a query. FIG. 2 is a flow diagram of a process for determining facts related to a query in accordance with respective examples. At 200, a query is received. For example, the query is received by a search engine. The query may be analyzed to determine if the query is a question query and is also a fact intent query. A query that is determined to be a question query and a fact intent query may have search results along with additional facts returned, rather than just search results. In an example, question intent is determined by training a classifier to determine if a query is question intent or not (implicit or explicit question). Keywords like what, when, how, where, and when may be signals but the classifier can detect implicit question intent queries as well. Fact intent may be determined using keywords like facts, information, about, tips, advice, data, info, instruction, report, etc.

Based on determining the query is a fact intent query, a topic of the query is determined. The topic of a query that matches a keyword may be the word or phrase before or after the keyword. For example, the topic of the query "facts about kale" would be kale based on the word kale following the keywords facts and about. As another example, lettuce would be the topic of the query "lettuce facts" based on the word lettuce being before the keyword facts.

Entity extraction may also be done on the query to determine the topic of the query. For example, entities such a location entity, person, organization, brand, concept, etc., may be extracted from the query. If the query contains an entity, that may indicate that the query is a fact intent query with the topic being the entity. For example, the query may be "Mona Lisa painting." Entity extraction may identify "Mona Lisa" as a work or painting and use "Mona Lisa" as the topic of the query. As additional examples, the queries "minecraft rules" and "alzheimer's symptoms" would have topics of Minecraft and alzheimer's respectively based on entity extraction.

In another example, a query may be associated with multiple topics. For example, "Who painted the Mona Lisa" may have two topics: "Mona Lisa" and "Leonardo da Vinci." In this example, the query is identified as a question regarding the painting "Mona Lisa." In addition, the "who" in the query indicates that the question is looking for an answer that is a person. Because the query is a question, a question and answer system may be used to find the answer to question, e.g., Leonardo da Vinci is the painter of the Mona Lisa. Accordingly, Leonardo da Vinci may also be a topic of the query. Topics may be ranked. In the last example, Leonardo da Vinci may be the primary topic since the query and answer system may determine the query is looking for a person and that person is Leonardo da Vinci. In other words, the primary topic is the answer to the query. Mona Lisa may be considered a secondary topic based on the entity extraction from the query.

If the query is determined to have a fact intent, facts related to the topic of the query are retrieved. At 210, the query is used to generate expanded queries. Expanded queries have the same intent as the original query, but are worded in a different way. In an example, the query is used to search stored content. The results of the search are used to find queries that have similar results. In an example, the URLs from the results are used to find queries that also returned the URLs. These queries that have similar results are used to expand the initial query. As an example, the query may be "facts about dolphins." This query may be used to search content that returns various URLs of web documents that contain content about dolphins. The top 3, 5, 10, etc., URLs may be used to find expanded queries that also return some or all the top URLs. For example, expanded queries may include "dolphins habitat", "dolphins diet", "dolphins lifespan."

At 220, related queries and/or question and answer pairs are determined. Related queries are queries related to the topic of the original query but are not found based on the related query returning similar URLs as the original query. Rather, the related queries are determined based on the topic or topics of the original query. For example, dolphin habitats is the topic of the query "facts about dolphin habitats." Related queries, for this example, are queries that have topics that are similar to dolphin habitats. For example, queries such as "bottlenose dolphin habitats", "natural habitat of dolphins", and "dolphin habitats and adaptation" may all be related queries to the "dolphin habitats" topic. Related queries may also be generated as questions based on the topic. For example, in the above example a related query may be "where are dolphin habitats" or "how do dolphins live?" In an example, the questions are formed based on adding a question word based on the extracted entity that formed the topic. For example, a location entity may be extracted from the phrase dolphin habitats. Based on the location entity, a where question may be formed. In this example, the where question is formed by combining the phrase "where are" with the plural topic "dolphin habitats."

Using the original query, the expanded queries, and the related queries, searchable content is searched to create results. In an example, each query is used to search the content independently. The results from each query may then be combined. The results include URLs to content. In addition, the results may include location information that indicates a location within the content that is related to the query. Using the location information, passages from each of the results may be extracted. If there is no location information, the content may be searched for words from the query to determine relevant passages. Using relevant passages from web documents obtained from various different sources, the relevant passages contain a richer set of passages compared to using passages from a single source URL.

At 230, the identified passages are ranked. The passages may be ranked using different ranking methods. In an example, various features from the passages are used to rank the passages. Some of the features are costlier to generate in terms of processing power, memory consumption and time compared to other features. Accordingly, a first ranking may be done on features that are faster to determine than other features. Features may include best matching (BM)25, translation model, expected answer type match, URL clicks, question answer similarity match, entity overlap, etc. Passages may be filtered based on the first ranking. Later ranking may use more expensive features. Filtering passages from earlier stages avoids the cost of calculating expensive features used in later rankings for every passage.

In an example, the passages are ranked based on their associated URL. URLs may be ranked based on a quality score associated with the server or portion of the URL. For example, URLs that point to a site that contains personal opinion information, such as opinions/reviews, may be ranked lower than a site that contains encyclopedic content. This ranking helps identify facts about a topic rather than opinions on the topic. Passages may also be ranked based on how many other queries return the passage's URL. in addition, how many other web documents link to the passage's URL may be used to determine a passage's ranking. Passage URLs that have more web content linking to the URL may have a better ranking than a URL with fewer web content linking. Passages may be filtered from the passages set based on the ranking.

As an example of using multiple levels of filtering, a later filtering may be based on entity extraction of the passages. Entity extraction may be costlier in terms or processing power and memory usage compared to using the passages' URL. Thus, filtering of passages based on URLs may be done first. The remaining passages may have entity extraction run to determine the entities within the remaining passages. Passages that have similar entities with the topic or topics of the original query are ranked higher than those with less similar entities.

In an example, a first round of filtering is based on a score of the URLs of the passages. In an example, the score is based on the popularity of the URL. For example, how often a URL appears in all searches may be used to create the score. Passages with score below a particular threshold may be filtered out of the result set. A second round of filtering may be done based on the similarity between the passage and the query. For example, bag of words and keywords overlap are two ways the similarity may be measured. After filtering out low ranking passages, a third and fourth round of ranking may be done using more expensive features. For example, semantic similarity, similar facts from multiple sources, domain authority, expected answer types, entity extraction, etc., may be used to calculate scores that are used to filter additional passage from the set of possible passages. Some of the scores may be aggregated across the remaining passages. Passages that include similar facts to other facts is one example of an aggregated score.

Facts are extracted from the unfiltered passages. At 240, the facts are cleaned in preparation for eventual rendering. In an example, sentences that are irrelevant or verbose are removed from the passage. Removed passages may be due to extraction issues or sources that have passages that are not succinct but are otherwise decent candidates because they contain the answer in some form within the passage. Extraction issues may happen when creating passages from the HTML pages of web documents. Many times the HTML markup has javascript or other content that is not accurately parsed or has extra characters, redundant lines from titles into paragraphs, etc. In an example, to determine verbosity, sentence breaker may be used to determine if consecutive sentences have a high word overlap or exact match. If there is a high word overlap or exact match, the consecutive sentences are determined to not be adding any new content. One of the redundant sentences may be removed. In an example, answers should not be too long due to space constraints to serve the answers on browser/mobile phones, etc. Accordingly, passages that are too long (e.g., determined by word count) may be removed, since multiple answers are being combined and the each of the final facts should add new information while conserving display space. Removing irrelevant and verbose sentences allows more facts that are relevant and/or easily digestible to be rendered in the search results for the query.

At 250, the cleaned facts are combined into a fact set. In an example, facts from the related queries and original query are separately ranked and filtered. These facts may then be combined. As part of the combining, deduplicating of candidate facts may be performed. This deduplication may be done using a similarity measurement. The similarity measurement between the facts may be determined. The similarity measurement indicates how similar one fact is to every other fact in the fact set. In one example, entity extraction is used to determine the similarity measurement between facts. For example, the facts: "Cashews are grown in India, Brazil, and Vietnam" and "India, Vietnam and Brazil are the biggest exporters of cashews" may be determined to be similar based on the same three country entities contained within both facts. As another example, presence of the same numerical content of information may be used to determine the similarity measurement between facts. For example, the fact set may include the facts: "average weight of a bottlenose dolphin is 1,400 lbs." and "A common bottlenose dolphin is around 1,400 lbs." These two facts may be considered similar based upon the presence of 1,400 lbs. in both facts.

At 260, the facts are filtered based on the similarity score. In an example, facts that have a similarity measurement above a threshold are filtered such that only one similar fact remains in the fact set. The facts may also be filtered based on having bad formatting, incorrect grammar, personal opinion, derogatory content, etc. The facts may also be sorted based on a query to fact similarity score, such that the fact that is most similar to the original query is the first fact.

At 270, facts from the fact set are rendered for display. In an example, the top 3, 5, 8, etc., facts are rendered. In an example, entities or keywords associated with the topic of the query are highlighted within the fact. In one example, the highlighted words are those that answer the topic of a query. For the "facts about dolphin habitats" query, words or phrases that are facts about dolphin habitats are highlighted. The query and the topic of the query may also be used to generate a title for the facts section.

In an example, the query is used to generate both the facts as described above and query results. The facts and the query results may be combined into a single search results page. FIG. 3 is an example search results screen 300 combining search results and related facts in accordance with respective examples. A query 310 is input into a search user interface (e.g., provided in a browser, mobile app) and submitted to a search platform. The search platform receives the query 310 and generates query results and facts as described above. The facts may be presented in a facts section 320 of the search results screen 300. The facts section 320 includes the top three facts as determined by the process described in FIG. 2. In other examples, the facts section may include more or less facts. Each fact may include a source URL that points to the source content from which the displayed fact was determined. The domain 340 of each source may be provided. The domains may be links to the source web document. The facts may be from various different source URLs. The query 310 may also be used to generate query results which may be displayed in a query results section 330 of the search results screen 300. Thus, a single screen may provide a user of the query 310 both query results and specific facts on the topic of the query 310.

Figure 4:
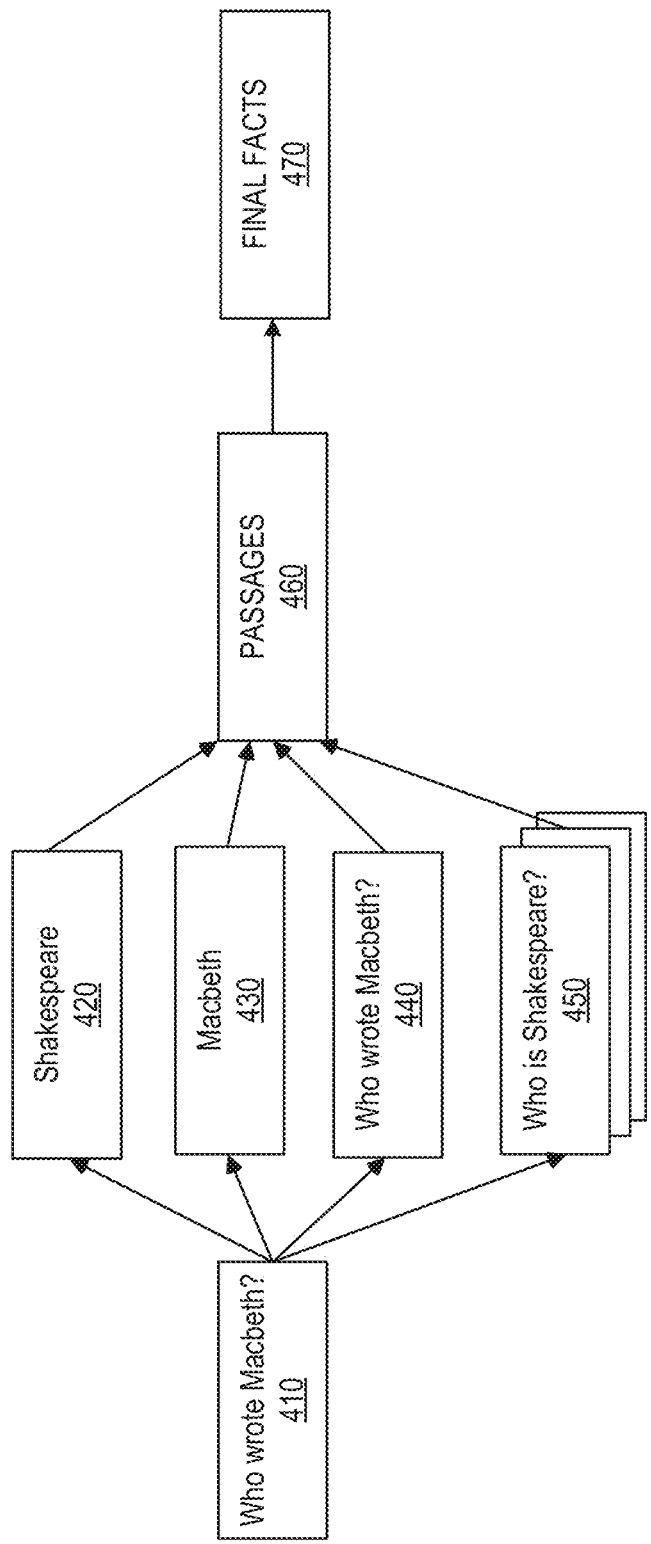
FIG. 4 is a block diagram of using a user search string to determine facts in accordance with respective examples.

FIG. 4 is a block diagram of using a user search string 410 to determine facts in accordance with respective examples. The user search string 410 is received and contains a question. The search platform may analyze the user search string 410 and determine the user search string is asking a who question about a work, Macbeth. Using a question and answer system, not shown, the search platform may search for an answer to the question. In this example, the answer is Shakespeare. Based on the user search string 410 asking a question, the search platform may determine that facts related to Shakespeare and Macbeth should be returned. To find possible facts, the search platform may generate various queries 450 for web documents. The topics of the user search string 410 may be determined. In this example, the topics are Shakespeare 420 and Macbeth 430. The topics may be determine using an entity extraction on the user search string 410. In addition, the answer to the question may also be used as the topic. The topics may be used to generate the queries 450. The topics 420 and 430 may themselves by used as queries to generate results. In addition, the user search string 410 may be used as a query to generate results. The queries 450 may also include queries that return similar results to the results from the user search string 410. The queries 450 may also include queries generated using the topics 420 and 430. In this example, based on the user search string 410 asking a who question, the queries 450 may include a query with the question rewritten with the answer.

The various queries 440 and 450 are used to query web documents to generate results. Passages 460 may then be extracted from the results. The passages 460 are passages of text that contain information about one of the topics 420 and 430. The passages 460 may be filtered and cleaned to create final facts 470 about the topics 420 and 430. The facts may be formatted for display along with search results from querying the web documents using the user search string 410.

Figure 5:
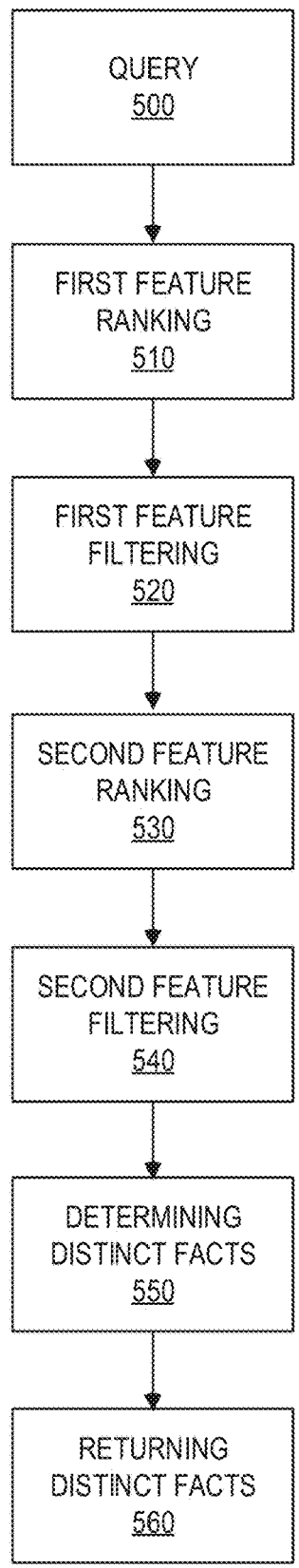
FIG. 5 is a flow diagram of a process for determining facts related to a query in accordance with respective examples.

FIG. 5 is a flow diagram of a process for determining facts related to a query in accordance with respective examples. At 500, website content, such as web documents, is queried using a user search string. The user search string is associated with a topic. The querying is performed with a number of different queries to generate results. The user search string may be expanded into multiple queries. The expansion may include queries that return similar results to the user search string. The multiple queries may also include queries that include entities from the user search string. The multiple queries return various web documents. From these web documents, passages related to the query that returned the web document are extracted.

At 510, a first feature is calculated based on the results from the queries. The results may include the web document or a passage along with its source web document. At 520, the first feature is used to filter the results. Some results are filtered out of the results, creating a smaller set of results. At 530 a second feature is calculated on the smaller set of results. At 540, the smaller set of results is filtered using the second feature. A feature has a cost associated with calculating the feature. The cost may include a time to calculate, processing power, and/or memory consumption. The second feature is more costly calculate compared to the first feature. Accordingly, the ordering of filtering reduces the results using the first feature such that the second feature is not calculated for every initial result.

At 550, distinct facts from the remaining results are determined. Facts are extracted from the results. In addition, deduplicating the facts may take place. The distinct facts may be derived from different source web documents. At 560, the distinct facts are returned. In an example, returning the distinct facts includes formatting the distinct facts for display in combination with search results from the user search string.

Figure 6:
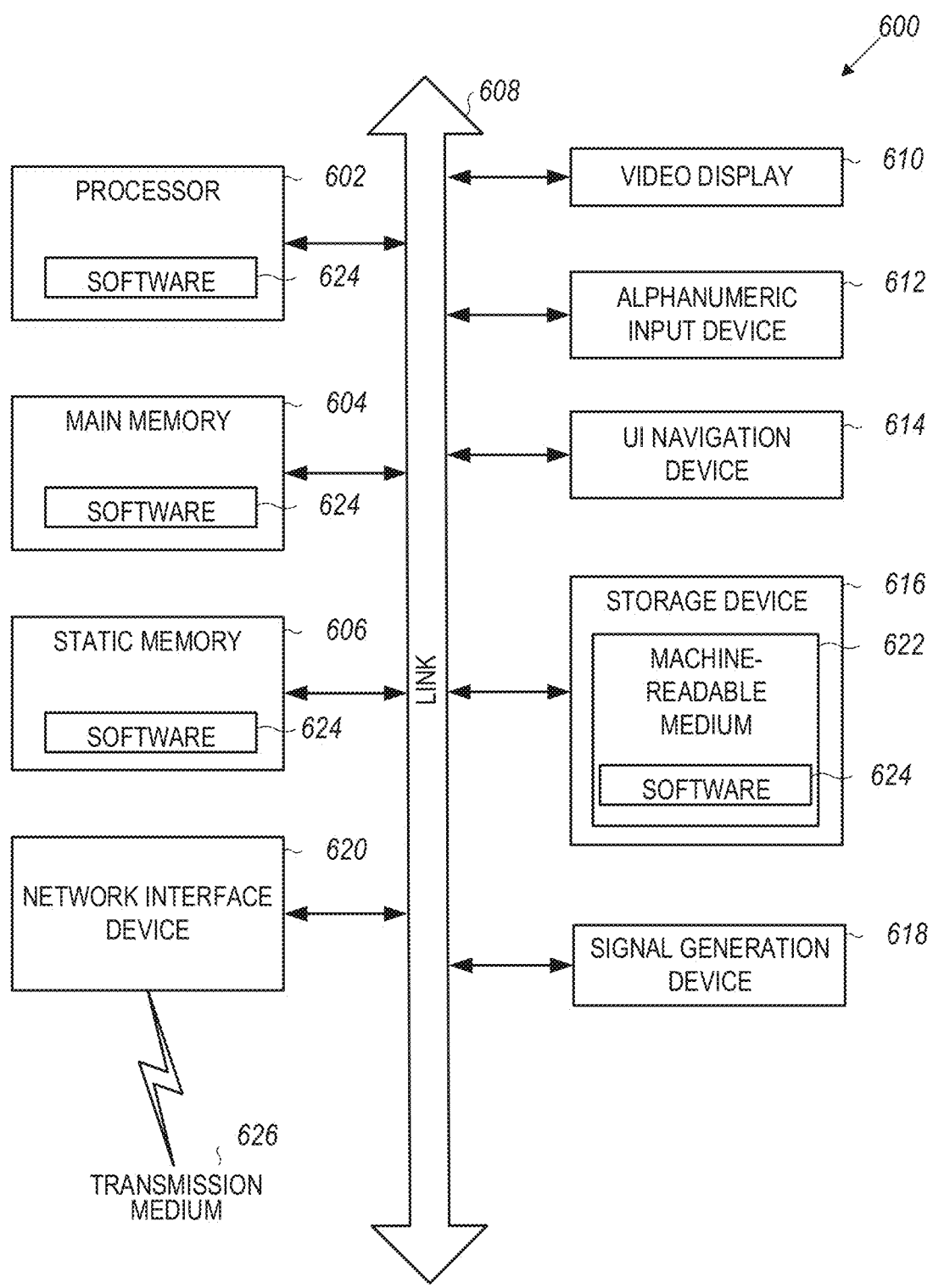
FIG. 6 is an example computing device that can be used in conjunction with the technologies described herein.

FIG. 6 is an example computing device that can be used in conjunction with the technologies described herein. In alternative embodiments, the computing device 600 may operate as a standalone device or may be connected (e.g., networked) to other computing devices. In a networked deployment, the computing device 600 may operate in the capacity of a server communication device, a client communication device, or both in server-client network environments. In an example, the computing device 600 may act as a peer computing device in peer-to-peer (P2P) (or other distributed) network environment. The computing device 600 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of device 110 and may perform the method of FIG. 2.

Computing device 600 may include a hardware processor 602 (e.g., a central processing unit (CPU), a graphics processing unit (GPU), a hardware processor core, or any combination thereof), a main memory 604 and a static memory 606, some or all of which may communicate with each other via a link (e.g., bus) 608. The computing device 600 may further include a display unit 610, an input device 612 (e.g., a keyboard), and a user interface (UI) navigation device 614 (e.g., a mouse). In an example, the display unit 610, input device 612, and UI navigation device 614 may be a touch screen display. In an example, the input device 612 may include a touchscreen, a microphone, a camera (e.g., a panoramic or high-resolution camera), physical keyboard, trackball, or other input devices.

The computing device 600 may additionally include a storage device (e.g., drive unit) 616, a signal generation device 618 (e.g., a speaker, a projection device, or any other type of information output device), a network interface device 620, and one or more sensors 621, such as a global positioning system (GPS) sensor, compass, accelerometer, motion detector, or other sensor. The computing device 600 may include an input/output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 616 may include a computing-readable (or machine-readable) storage media 622, on which is stored one or more sets of data structures or instructions 624 (e.g., software) embodying or utilized by any one or more of the techniques or functions described herein. In an example, at least a portion of the software may include an operating system and/or one or more applications (or apps) implementing one or more of the functionalities described herein. The instructions 624 may also reside, completely or at least partially, within the main memory 604, within the static memory 606, and/or within the hardware processor 602 during execution thereof by the computing device 600. In an example, one or any combination of the hardware processor 602, the main memory 604, the static memory 606, or the storage device 616 may constitute computing device (or machine) readable media.

While the computer-readable storage media 622 is illustrated as a single medium, a "computer-readable storage media" or "machine-readable storage media" may include a single medium or multiple media (e.g., a centralized or distributed database, and/or associated caches and servers) configured to store the one or more instructions 624.

In an example, a computer-readable storage media or machine-readable storage media may include any medium that is capable of storing, encoding, or carrying instructions for execution by the computing device 600 and that cause the computing device 600 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 620 may use the transfer protocols to transmit data using transitory propagating signals.

In an example, the network interface device 620 may include one or more physical jacks (e.g., Ethernet, coaxial, or phone jacks) or one or more antennas to connect to the communications network 626. In an example, the network interface device 620 may include one or more wireless modems, such as a Bluetooth modem, a Wi-Fi modem or one or more modems or transceivers operating under any of the communication standards mentioned herein. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. In an example, a transmission medium may include any intangible medium that is capable of storing, encoding or carrying instructions for execution by the computing device 600, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method synthesizing facts from multiple sources, the method comprising:
   receiving a user search string associated with a topic;
   generating a plurality of queries associated with the user search string;
   querying website content, using the plurality of queries associated with the user search string, to generate results;
   ranking the results based on a first feature associated with the results;
   filtering the results based on the first feature to generate intermediate results that are a subset of the results;
   ranking the intermediate results based on a second feature associated with the results, the second feature being computationally more costly to calculate than the first feature;
   filtering the ranked intermediate results based on the second feature to generate final results;
   determining distinct facts from the final results, wherein the distinct facts comprise content from different URLs; and
   returning the distinct facts associated with the topic.

2. The method of claim 1, wherein the first feature comprises a universal resource locator (URL) associated with the results, and wherein the second feature comprises entity matching from the query and the filtered results.

3. The method of claim 2, wherein the entity matching comprises matching a person entity in a result with the person entity in the user search string.

4. The method of claim 1, further comprising determining the user search string comprises a question intent regarding the topic.

5. The method of claim 4, further comprising determining the user search string comprises a fact intent regarding the topic.

6. The method of claim 5, further comprising performing entity matching on the user search string to determine an entity within the user search string, and wherein generating a plurality of queries associated with the user search string comprises generating a query based on the entity within the user search string.

7. The method of claim 1, wherein determining the distinct facts comprises:
   determining similar content present in a plurality of results in the final results; and
   removing all but one result from the plurality of results in the final results based on the similar content.

8. The method of claim 1, wherein generating a plurality of queries associated with the user search string comprises:
  determining a first result from the user search string points to a first URL;
  determining a second query that produces a second result that points to the first URL, wherein the plurality of queries comprises the second query.

9. The method of claim 1, further comprising:
  determining question and answer pairs related to the topic from the user search string;
  querying, using the question and answer pairs, the website content, wherein the generated results comprise results from the querying using the question and answer pairs.

10. The method of claim 1, further comprising:
  determining a server that hosts personal opinion information; and
  filtering content based on the URL associated with the results wherein the URL is associated with the server.

11. The method of claim 1, further comprising:
  querying the website content using the user search string to generate query results;
  formatting the query results on a search results page; and
  formatting the distinct fact on the search results page, wherein a source for each of the distinct facts and a source for each of the query results can be reached directly on the search results page.

12. A system synthesizing facts from multiple sources, the system comprising:
  an electronic processor configured to:
  receive a user search string associated with a topic;
  generate a plurality of queries associated with the user search string;
  query web site content, using the plurality of queries associated with the user search string, to generate a set of results;
  rank the set of results based on a first feature associated with the results;
  filter the set of results based on the first feature to generate a set of intermediate results that is a subset of the set of results;
  rank the set of intermediate results based on a second feature associated with the results, the second feature being more costly to calculate than the first feature;
  filter the ranked set of intermediate results based on the second feature to generate a set of final results that is a subset of the set of intermediate results;
  determine distinct facts from the set of final results, wherein the distinct facts comprise content from different URLs; and
  return the distinct facts associated with the topic.

13. The system of claim 12, wherein the first feature comprises a universal resource locator (URL) associated with the results, and wherein the second feature comprises entity matching from the query and the filtered results.

14. The system of claim 13, wherein the entity matching comprises matching a person entity in a result with the person entity in the user search string.

15. The system of claim 12, wherein the electronic processor is further configured to determine the user search string comprises a question intent regarding the topic.

16. The system of claim 15, wherein the electronic processor is further configured to determine the user search string comprises a fact intent regarding the topic.

17. The system of claim 16, wherein the electronic processor is further configured to perform entity matching on the user search string to determine an entity within the user search string, and wherein to generate a plurality of queries associated with the user search string the electronic processor is configured to generate a query based on the entity within the user search string.

18. A computer-readable storage media storing computer-executable instructions synthesizing facts from multiple sources, the stored instructions comprising:
  instructions to receive a user search string associated with a topic;
  instructions to generate a plurality of queries associated with the user search string;
  instructions to query website content, using the plurality of queries associated with the user search string, to generate results;
  instructions to rank the results based on a first feature associated with the results;
  instructions to filter the results based on the first feature to generate intermediate results;
  instructions to rank the intermediate results based on a second feature associated with the results, the second feature being more costly to calculate than the first feature;
  instructions to filter the ranked intermediate results based on the second feature to generate final results that are a subset of the generated results;
  instructions to determine distinct facts from the final results, wherein the distinct facts comprise content from different URLs; and
  instructions to return the distinct facts associated with the topic.

19. The computer-readable storage media of claim 18, wherein the first feature comprises a universal resource locator (URL) associated with the results, and wherein the second feature comprises entity matching from the query and the filtered results.

20. The computer-readable storage media of claim 19, wherein the entity matching comprises matching a person entity in a result with the person entity in the user search string.

* * * * *